United States Patent
van den Berg et al.

(10) Patent No.: US 10,110,380 B2
(45) Date of Patent: Oct. 23, 2018

(54) SECURE DYNAMIC ON CHIP KEY PROGRAMMING

(75) Inventors: Henricus Hubertus van den Berg, Nijmegen (NL); Thierry Gouraud, Brussels (BE)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 13/427,751

(22) Filed: Mar. 22, 2012

(65) Prior Publication Data

US 2013/0163764 A1    Jun. 27, 2013

(30) Foreign Application Priority Data

Mar. 28, 2011    (EP) .................................... 11159926

(51) Int. Cl.
*H04L 9/08* (2006.01)
*G06F 21/57* (2013.01)

(52) U.S. Cl.
CPC .......... *H04L 9/0866* (2013.01); *G06F 21/572* (2013.01); *H04L 9/08* (2013.01); *H04L 9/0822* (2013.01); *H04L 2209/12* (2013.01); *H04L 2463/061* (2013.01)

(58) Field of Classification Search
CPC .. G06F 21/60; G06F 2221/2107; G06F 21/44; G06F 21/602; G06F 12/1408; G06F 21/30; G06F 2211/007; G06F 21/10; G06F 21/73; G06F 21/606; H04L 9/16; H04L 63/0853; H04L 63/0428; H04L 63/0876; H04L 63/062; H04L 9/0861; H04L 9/0877; H04L 9/0891; H04L 9/08; G11B 20/00536; H04W 12/06; H04W 12/08; H04W 12/04

USPC ................................ 380/200, 277; 726/2, 26
See application file for complete search history.

(56) References Cited

U.S. PATENT DOCUMENTS

| | | | |
|---|---|---|---|
| 5,416,840 A | | 5/1995 | Cane et al. |
| 5,805,706 A | * | 9/1998 | Davis ........................ H04L 9/06 713/153 |
| 5,999,629 A | * | 12/1999 | Heer .................. G06Q 20/3829 380/281 |
| 7,051,211 B1 | | 5/2006 | Matyas, Jr. et al. |
| 7,313,828 B2 | * | 12/2007 | Holopainen .......... G06F 21/125 380/270 |

(Continued)

OTHER PUBLICATIONS

"Flash Memory," Wikipedia article (http://en.wikipedia.org/wiki/Flash_memory), 16 pages.*

Primary Examiner — Tae K Kim

(57) ABSTRACT

Provisioning an integrated circuit with confidential data, by receiving in the integrated circuit encrypted confidential data, the encrypted confidential data having been encrypted with a transport key, deriving in the integrated circuit the transport key by applying a key derivation function to a customer identifier, the customer identifier having been previously stored in the integrated circuit, decrypting in the integrated circuit the encrypted confidential data with the transport key to obtain decrypted confidential data, deriving in the integrated circuit a product key by applying a key derivation function to an integrated circuit identifier, the integrated circuit identifier having been previously stored in the integrated circuit, encrypting in the integrated circuit the decrypted confidential data with the product key to obtain re-encrypted confidential data, and storing the re-encrypted confidential data in a confidential data memory of the integrated circuit.

12 Claims, 6 Drawing Sheets

(56) References Cited

U.S. PATENT DOCUMENTS

| | | | |
|---|---|---|---|
| 7,539,312 B2* | 5/2009 | Fujiwara | G06F 21/123 380/202 |
| 8,032,764 B2* | 10/2011 | Shankar | G06F 21/6209 713/169 |
| 8,181,869 B2* | 5/2012 | Lu | G06Q 20/206 235/379 |
| 8,396,803 B1* | 3/2013 | Dala et al. | 705/52 |
| 8,589,701 B2* | 11/2013 | England | G06F 21/6218 380/278 |
| 2003/0056107 A1* | 3/2003 | Cammack | G06F 21/10 713/189 |
| 2004/0025010 A1* | 2/2004 | Azema | G06F 21/10 713/156 |
| 2004/0034823 A1* | 2/2004 | Watkins | G06F 21/71 714/724 |
| 2006/0015754 A1* | 1/2006 | Drehmel | G06F 21/72 713/193 |
| 2006/0044861 A1* | 3/2006 | Smith | G11C 17/16 365/94 |
| 2006/0129848 A1* | 6/2006 | Paksoy | G06F 21/78 713/193 |
| 2006/0236111 A1* | 10/2006 | Bodensjo | G06F 12/1466 713/176 |
| 2007/0217614 A1* | 9/2007 | Fujiwara | G06F 21/123 380/277 |
| 2008/0316789 A1* | 12/2008 | Fredeman | G11C 17/16 365/96 |
| 2009/0060197 A1* | 3/2009 | Taylor et al. | 380/277 |
| 2009/0320141 A1* | 12/2009 | Wang | G06F 21/6218 726/27 |
| 2010/0180130 A1* | 7/2010 | Stahl | G06F 21/10 713/193 |
| 2010/0225810 A1* | 9/2010 | Berkvens | H04N 21/4307 348/500 |
| 2011/0238578 A1* | 9/2011 | Hurry | G06Q 20/085 705/65 |
| 2012/0027214 A1* | 2/2012 | Yokota | G06F 21/10 380/286 |
| 2012/0079287 A1* | 3/2012 | Leclercq | G06F 21/575 713/192 |
| 2012/0089839 A1* | 4/2012 | Qiu | H04L 9/006 713/171 |
| 2013/0097429 A1* | 4/2013 | Grandcolas | H04L 9/0825 713/185 |

* cited by examiner

SECURE DYNAMIC ON CHIP KEY PROGRAMMING

This application claims the priority under 35 U.S.C. § 119 of European patent application no. 11159926.2, filed on Mar. 28, 2011, the contents of which are incorporated by reference herein.

FIELD OF THE INVENTION

The invention relates to a method for provisioning an integrated circuit with confidential data, the method comprising receiving in the integrated circuit confidential data, and storing the confidential data in a confidential data memory of the integrated circuit.

The invention further relates to an integrated circuit.

BACKGROUND OF THE INVENTION

Many modern devices require provisioning with confidential data. Such devices include devices that process valuable information, e.g., financial and content application; for example: set-top boxes, mobile phones, smart cards, tablets etc. There are more needs for secure provisioning however, for example, a device for which a secure boot process is desired to keep the firmware private needs a secret key. Confidential data also includes feature configuration data which determines which features of a devices or application are turned on.

One particular device in which both applications of provisioning are needed is car radio. Car radio applications have proprietary firmware which needs protection, e.g., through encryption thereof and a secure boot. Car radio applications also need secret keys for DRM applications.

The provisioning of secret keys, in particular symmetric keys can be a very expensive process. One reason for this is that the keys need to be transported from the device where the key is generated to the device where the key is inserted. There are hardware solutions for secure key transport and loading but these can require a great deal of operation overhead and are typically cost-prohibitive.

One possibility is for a customer of an integrated circuits manufacturer to send the keys via a secure channel to a closed and secure environment in the factory. This secure environment is costly to setup and to maintain. The second problem is that this key needs to be programmed in the IC and traditionally, this key is sent in the clear by tester equipment to the IC via e.g. a JTAG interface. The tester needs to generate the correct programming sequences to program the keys in the one-time programmable memory, such as eFuses. This programming sequence is time consuming as the eFuse needs to be programmed bit by bit.

SUMMARY OF THE INVENTION

It would advantageous to have an improved method of provisioning an integrated circuit with confidential data.

An advantageous method for provisioning an integrated circuit with confidential data is provided. The method comprises receiving in the integrated circuit encrypted confidential data, the encrypted confidential data having been encrypted with a transport key, deriving in the integrated circuit the transport key by applying a key derivation function to a customer identifier, the customer identifier having been previously stored in the integrated circuit, decrypting in the integrated circuit the encrypted confidential data with the transport key to obtain plain confidential data, deriving in the integrated circuit a product key by applying a key derivation function to an integrated circuit identifier, the integrated circuit identifier having been previously stored in the integrated circuit, encrypting in the integrated circuit the plain confidential data with the product key to obtain re-encrypted confidential data, and storing the re-encrypted confidential data in a confidential data memory of the integrated circuit.

After creation the confidential data need not appear in the clear outside of the working memory of integrated circuit. The confidential data arrives ready for provisioning in encrypted form. The key used for the encryption need not be available during the provisioning process. Indeed, the confidential data is received in the integrated circuit in encrypted form. Thus the provisioning method need simply pass through encrypted material without the need for high security. The transport key need not be provisioned to the integrated circuit since it is derived in the integrated circuit itself. The details of the key derivation function need not be available outside the integrated circuit during the provisioning. Once in the integrated circuit the confidential data is re-encrypted with a key which depends on an integrated circuit ID. Even if the confidential data is reversed engineered from the confidential memory it is useless outside the integrated circuit since the reversed engineered confidential data is encrypted.

Although confidential data encrypted with a transport key is available, an attacker is blocked from inserting it himself in the confidential memory since it requires re-encryption with a product which is not available outside the integrated circuit.

For example, in an embodiment, confidential data may be distributed as follows. A transport key is derived by applying a key derivation function to a customer identifier; this step may be done by a first party at a first location. The first party may be, say, a card or IC manufacturer. The transport key is then sent by the first party to a customer. The customer is a party that selects confidential data, e.g., keys for provisioning. The customer may know his own customer identification. Preferably, he is not given all elements for deriving the transport key, e.g., he does not have one of the customer identifier, the key derivation function, or a master transport key on which the key derivation function may depend. The customer uses the transport key to encrypt confidential data. For example, he may generate secret keys or configuration data etc. The customer sends the encrypted data to a programming facility. The programming facility does not have the transport key and is not capable of decrypting the confidential data. Using one of the methods of provisioning described herein, the encrypted confidential data is send to an integrated circuit, so that the confidential data is not in the clear outside the integrated circuit.

The integrated circuit may be a CMOS circuit. The integrated circuit may be part of a larger circuit board, or a smart card, or a computer, and the like.

The confidential data may comprise one or more secret keys. The confidential data may also consist of a secret key. The confidential data may comprise configuration data, for configuring the integrated circuit. The configuration data may indicate which features of the integrated circuit are enabled and which are disabled. The confidential data may comprise proprietary software, e.g., audio processing algorithms.

Receiving data in the integrated circuit may be done using testing equipment, e.g., using a JTAG interface.

The confidential data may be encrypted with a transport key using a cryptographic encryption algorithm. A symmetric encryption algorithm is preferred. Example algorithms include, AES, Blowfish, Twofish, etc. Decryption requires the decryption algorithm corresponding to the encryption algorithm. To re-encrypt the confidential data with a product key, preferably the same algorithm is used, since it allows re-use of the engine.

There are many key derivation functions which may be used to derive the transport key or product key. Preferably, the same algorithm is used for both derivations, but this is not necessary.

In cryptography, a key derivation function (or KDF) derives a secret key from a secret value, e.g., a master key, and an identifier typically using a pseudo-random function. A key derivation function may derive different secret keys by combining a master key with different other data, e.g., the customer identifier or integrated circuit identifier. The other data may be less-secret or even public. Examples of such key derivation functions include keyed cryptographic hash functions, and KDF1, defined in IEEE Std 1363-2000.

The key derivation function may have access to a master key, e.g. master transport key, stored on the integrated circuit. The master key serves as the secret component in the key derivation. The master key may be stored in the integrated circuit. Preferably the master key is hard coded in the integrated circuit, e.g. in a ROM or even in gates. The secret may also be stored implicitly, by applying function composition to the master key and the key derivation function; in the latter form the key derivation function is fixed for the particular secret. The latter approach could even be extended by having the key derivation function implemented in the form of a white box implementation, taking an identifier as input and having a fixed master key.

One advantageous choice for the key derivation is to derive the transport key with the AES algorithm from a master transport key and the customer ID. In particular if the AES algorithm is also used for the decryption and/or re-encryption steps this saves hardware. Similarly, the product key may be derived with the AES algorithm from a master transport key and the integrated circuit identifier.

In a practical implementation, AES may be used for key derivation as follows: the master key is used as the AES key and the customer or IC identifier is encrypted with AES and the master key. The resulting encryption is the derived transport or product key. Preferably, the integrated circuit comprises an AES engine for executing the AES algorithm. The AES engine is preferably implemented in hardware. The result of the AES encryption may be placed in an internal register of the AES engine, so that its result is shielded from those parts of the integrated which do not have access to the internal register. In a preferred implementation, the AES Engine is configured to receive a command to shift the contents of the internal register to a key register, so that an next encryption or decryption may use the contents of the internal register as the new encryption or decryption key. This is more secure since the key does not need to leave the AES engine.

The customer identifier and/or integrated circuit identifier may a number, represented as a string of bits. For example the customer identifier and/or integrated circuit identifier may be, say, 32, 64 or 128 bits long.

The customer identifier and integrated circuit identifier may be stored in the integrated circuit in various ways. The customer identifier is preferably unique for a particular customer, or for a batch of integrated circuits for this customer. The customer identifier could be stored on the integrated circuit by embedding it in a ROM mask used during manufacture of the integrated circuit.

In an embodiment, the integrated circuit comprises a secure part and a non-secure part, the secure part comprises a symmetric cipher engine and a controller, the symmetric cipher engine is only accessible from the non-secure part through the controller. The symmetric cipher engine is used at least for the decrypting and re-encrypting. Preferably the symmetric cipher engine is also used for the key derivations.

In a preferred embodiment the customer identifier and/or integrated circuit identifier are stored in the integrated circuit in one-time programmable memory, e.g., eFuses. To reduce configuration time, the integrated circuit may contain a circuit for receiving an identifier in full and then programming the eFuses. Although this increases the size of the integrated circuit, it reduces significantly the number of programming cycles needed for programming an identifier. For example, the integrated circuit may receive the customer identifier, and store the received customer identifier one bit at a time in a one-time programmable customer memory by a controller of the integrated circuit after the customer identifier has been received substantially completely. Similarly, the integrated circuit may receive the integrated circuit identifier, and store the received integrated circuit identifier one bit at a time in a one-time programmable customer memory by a controller of the integrated circuit after the integrated circuit identifier has been substantially received completely.

In an embodiment, the confidential data memory of the integrated circuit may be any non-volatile memory, e.g. flash memory. Preferably, the re-encrypted confidential data is stored in one-time programmable memory of the integrated circuit, e.g., eFuses.

As with the programming of identifiers, it is an advantage that the re-encrypted confidential data may be stored after the encrypted confidential data has been received completely, this reduces configuration time of the integrated circuit, which is a costly procedure. In an embodiment, the re-encrypted confidential data is stored one bit at a time in the one-time programmable memory by a controller of the integrated circuit. For example, eFuse memory is preferably programmed in multiple cycles, e.g., one bit at a time.

It is advantageous to verify that the stored re-encrypted data is correct; e.g., to detect errors or tampering during programming. If the confidential data is a secret key or comprises a secret key an advantageous way of verifying uses a test vector: First the secret key is obtained, typically by decrypting, with the product key and within the integrated circuit, the re-encrypted secret key stored in the confidential data memory of the integrated circuit, to obtain a resulting key. It is to be verified if the resulting key is or is not the secret key that was intended. It is envisioned that decrypting, with the product key and within the integrated circuit, the re-encrypted secret key stored in the confidential data memory of the integrated circuit is a procedure the integrated circuit would do when it needs the secret key in practice, e.g., for a secure boot, or a DRM application. After the resulting key has been obtained, a test vector embedded in the integrated circuit is encrypted with the resulting key, to obtain a computed fingerprint. The computed fingerprint is compared with an expected fingerprint. Interestingly, the test vector need not be known in the programming facility. The expected fingerprints may have been obtained at the same location or by the same party that generated the secret key. At the location where the computed fingerprint is compared, typically at the programming facility only the expected fingerprint is needed. The test vector may therefore be embedded in the integrated circuit, in a read-only manner, e.g., in a ROM or embedded in gates. If the computed and expected fingerprints are the same it virtually assures that the key was stored correctly, yet there is no need for the secret key to be known in the plain outside the integrated circuit.

Another way to verify the stored secret key is to add a checksum of the secret key to the confidential data. The checksum may be an encryption of a test vector, but may also be a hash or a CRC. The checksum may preferably be implemented in hardware, most preferably with relatively few gates, say less than 10% of the gates used for the AES engine; say using a CRC, such as CRC-32 or CRC-64. The checksum may be used during a secure boot sequence to compute a checksum of the key that is stored in the confidential memory. The computed checksum is compared to the received checksum. If the computed checksum and the received checksum do not match, the secure boot sequence will stop and the integrated circuit is not usable. In an embodiment the checksum is received encrypted with the transport key, is decrypted therewith and re-encrypted with the product key before storing in the confidential memory.

A further aspect of the invention concerns the distributing confidential data. This comprises deriving a transport key by applying a key derivation function to a customer identifier, sending the transport key to a customer; at the customer, encrypting confidential data with the transport key; sending the encrypted confidential data to a programming facility; and at the programming facility, provisioning an integrated circuit with the encrypted confidential data. Preferably, provisioning an integrated circuit with the encrypted confidential data is done using a method for provisioning an integrated circuit according to the invention, e.g., as defined in claim 1.

A further aspect of the invention concerns an integrated circuit configured for provisioning with confidential data, the integrated circuit comprising a receiver configured to receive in the integrated circuit encrypted confidential data, the encrypted confidential data having been encrypted with a transport key, a customer identifier storage configured to a stored customer identifier, a transport key deriver configured to derive in the integrated circuit the transport key by applying a key derivation function to the customer identifier, a decrypting module configured to decrypt in the integrated circuit the encrypted confidential data with the transport key to obtain decrypted confidential data, a integrated circuit identifier storage configured to stored an integrated circuit identifier, a product key deriver configured to derive in the integrated circuit a product key by applying a key derivation function to an integrated circuit identifier, an encrypting module to encrypt in the integrated circuit the decrypted confidential data with the product key to obtain re-encrypted confidential data, and a confidential data memory configured to store the re-encrypted confidential data.

An advantageous integrated circuit comprises a cipher engine, e.g., a symmetric cipher engine, a controller, a confidential data memory and a receiver, the receiver is configure to receive in the integrated circuit encrypted confidential data, the encrypted confidential data having been encrypted with a transport key; a part of the controller is configured to derive in the integrated circuit the transport key by applying a key derivation function to a customer identifier using the cipher engine, the customer identifier having been previously stored in the integrated circuit; a part of the controller is configured to decrypt in the integrated circuit the encrypted confidential data with the transport key to obtain decrypted confidential data using the cipher engine; a part of the controller is configured to derive in the integrated circuit a product key by applying a key derivation function to an integrated circuit identifier using the cipher engine, the integrated circuit identifier having been previously stored in the integrated circuit; a part of the controller is configured to encrypt in the integrated circuit the decrypted confidential data with the product key using the cipher engine to obtain re-encrypted confidential data; and a part of the controller is configured to store the re-encrypted confidential data in the confidential data memory of the integrated circuit.

A part of the controller may be implemented in gates, e.g., representing a state of a state machine, e.g., e.g., instructions of a controlling software programming. The cipher engine is configured to run a symmetric cipher, say a block cipher, either for encryption or decryption.

A method of the invention may be implemented in hardware in an integrated circuit. For example a finite state machine may handle the various steps and transitions. The hardware implementation is preferred; however the invention may also be implemented in computer instructions stored on the integrated circuit and suitable for execution by a processor of the integrated circuit. In particular decryption, re-encryption and key derivation may be done in software. Alternatively, the decryption, re-encryption and key derivation may be done in dedicated hardware, e.g., an AES engine, whereas the control is done in software. On the other hand control may also be done in hardware. Receiving of information may be done through a suitable interface, say a JTAG interface.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 5b is a schematic flow-chart for provisioning an integrated circuit with confidential data with the system of FIG. 5a.

Figure 1:
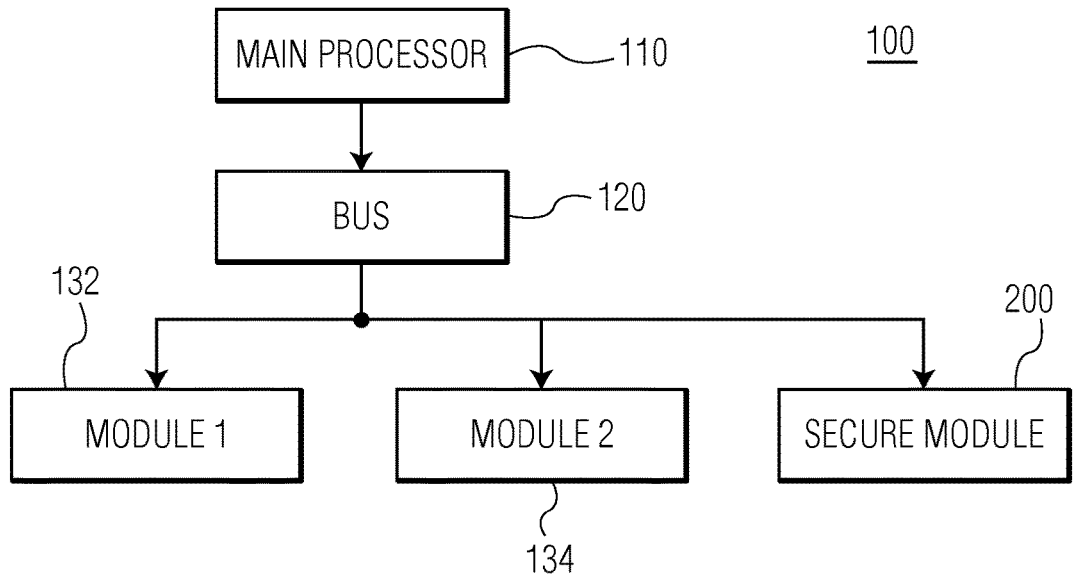
FIG. 1 is a schematic block diagram of an integrated circuit.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 is a schematic block diagram of an integrated circuit. The integrated circuit shown in FIGS. 1 comprises a main processor 110, a bus 120 and one or more peripherals, also referred to as modules. Processor 110 may a general purpose cpu, e.g., an ARM, 8051, MIPS processor or the like. There are three modules shown, a secure module 200, and two other modules 131 and 132. Secure module 200 is configured to provision the integrated circuit with confidential data.

Modules 131 and 132 represent a variety of possible modules useful in an integrated circuit. For example, a module may be dedicated to communication, e.g., contactless communication; a module may be dedicated to audio processing, e.g., a DSP. It is possible for the integrated circuit to use a monolithic design, without modules.

The integrated circuit may comprise non-volatile memory for storing a software program for execution on the integrated circuit, e.g., by processor 110.

Figure 2:
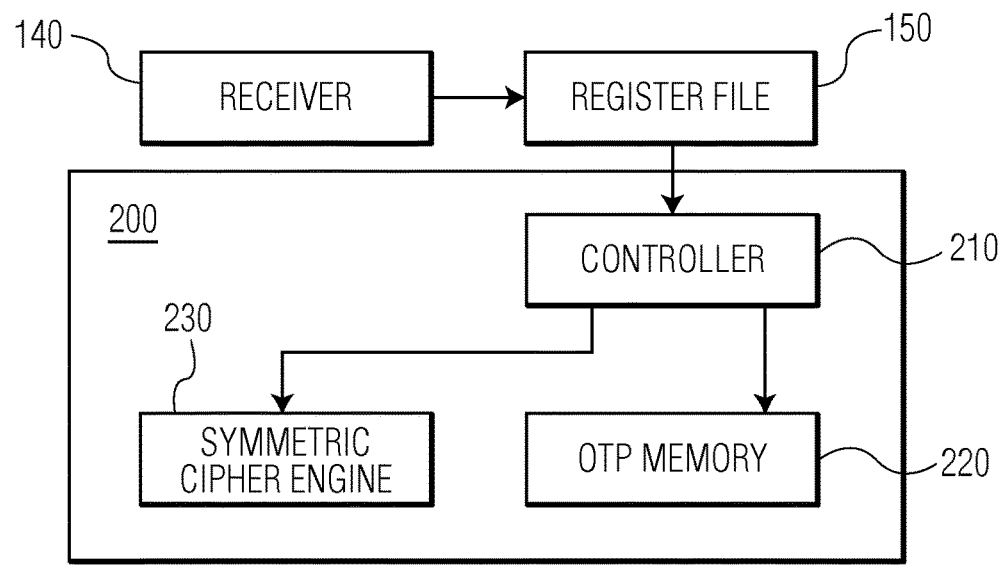
FIG. 2 is a schematic block diagram of an integrated circuit.

FIG. 2 show additional details that may be present in the integrated circuit of FIG. 1. FIGS. 2 shows a possible implementation of secure module 200 and a receiver 140 configured to receive in the integrated circuit encrypted confidential data, the encrypted confidential data having been encrypted with a transport key. The receiver may be part of a module, as shown in FIG. 1. In one option, the receiver is configured to store the received encrypted confidential data in a register file 150. Register file 150 is accessible from secure module 200, e.g., via bus 120. Receiver 140 may be a JTAG interface.

Secure module 200 comprises a symmetric cipher engine configured to selectably encrypt or decrypt data with a configurable key. In an embodiment the symmetric cipher engine is an AES engine configured for the symmetric cipher AES. Preferably, engine 230 is implemented in hardware. The secure module may also be referred to as the secure part.

Secure module 200 further comprises a controller configured to implement a method for provisioning described herein. The controller may be implemented as a processor running software, however it is preferred if the controller is implemented in hardware. For example, the controller may be constructed as a finite state machine.

Secure module 200 further comprises the confidential memory, e.g., in the form of one-time programmable memory 220. Examples of a one-time programmable memory include eFuses, polyfuses, antifuses, laser fuses, and the like.

One-time programmable non-volatile memory is a form of digital memory in which data may be permanently stored by programming the memory after the device is constructed. It is possible to implement secure module 200 with regular programmable non-volatile memory instead of OTP memory 220, e.g., flash memory, however it is considered less secure.

OTP memory 220 stores at least a customer identifier, and a product identifier. These identifiers may have been received through receiver 140, possibly in the plain (unencrypted). Controller 150 may be configured to obtain the identifier from the register file, in which they were stored by receiver 140 and writing them in memory 220.

Secure module 200 may comprise a private bus for communicating between controller 210, cipher engine 230 and confidential memory 220. Private registers of cipher engine 230 are accessible by controller 210 through the private bus. Private registers of cipher engine 230 and memory 220 are not directly connected to main bus 120. Controller 210 may provide an interface to processor 110 comprising e.g. a command to decrypt data provided by processor 110 by a key contained in memory 220. In this way, a secret key provisioned to the integrated circuit is useable by processor 110, yet remains secret and contained in the secure module.

Possible ways in which integrated circuits such as the one described above may be used, will be explained in conjunction with FIGS. 3a, 3b, 4a and 4b. However it is noted that variations in hardware for using the flowcharts are possible.

Figure 3A:
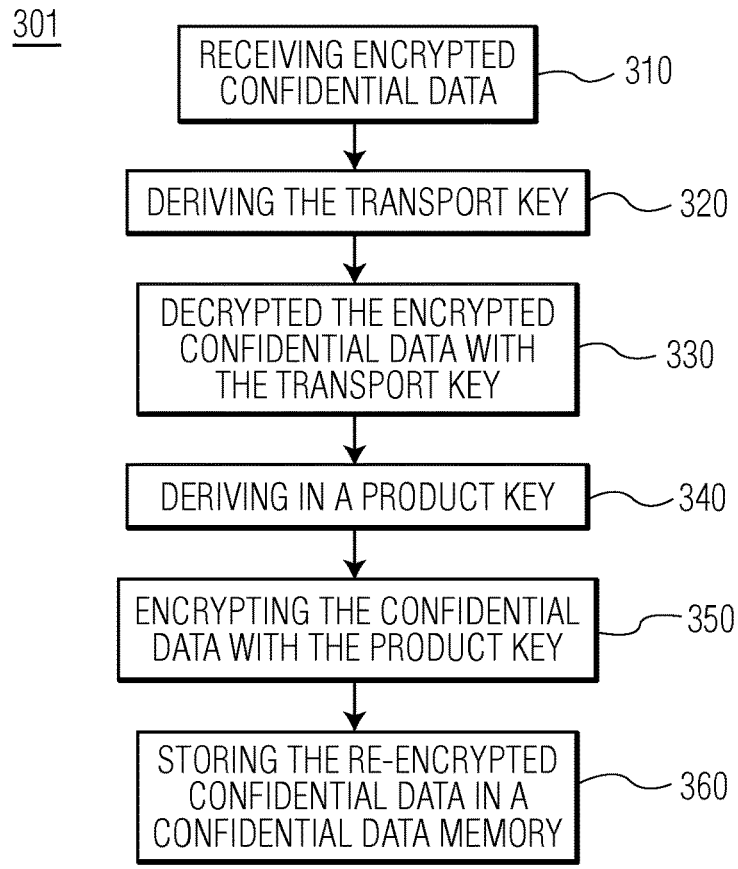
FIG. 3a is a schematic flow-chart for provisioning an integrated circuit with confidential data.
Figure 4A:
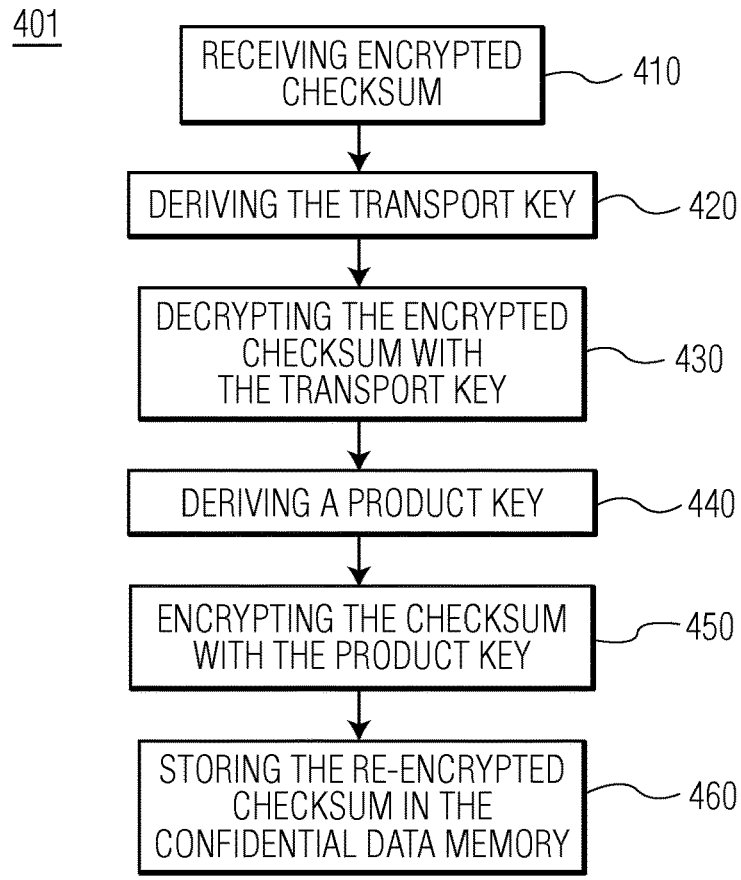
FIG. 4a is a schematic flow-chart for provisioning an integrated circuit with a checksum.

FIG. 3a is a schematic flow-chart for provisioning an integrated circuit with confidential data. FIG. 4a is a schematic flow-chart for provisioning an integrated circuit with a checksum. The provisioning with confidential data and a corresponding checksum may be combined, but this is not necessary; each of the explained and/or shown methods have independent merit. For example, one may use the method of FIG. 3a while transmitting a checksum to the integrated circuit in the plain.

FIG. 3a illustrates a confidential data provisioning method 301. FIG. 4a illustrates a checksum data provisioning method 401. It assumed that the integrated circuit has previously been provisioned with a customer identifier and an integrated circuit identifier. The customer identifier is assumed to be the same for a number of integrated circuits, e.g. all integrated circuits for a particular customer, or for a particular application, particular market, particular technology etc. Through different customer numbers all integrated circuits are portioned into different batches, so that a security breach may be confined. The integrated circuit number is preferably unique for each integrated circuit. One way of provisioning these numbers is to send the identifiers over through an interface, say using receiver 140. In a more advanced way the numbers are sent over completely before storing in one-time-programmable 220 to reduce transmission time.

In step 310 encrypted confidential data is received. The confidential data may comprise a secret key. The secret key may be a symmetric key, say a 128 or 256 bit AES key. The secret key may also be an asymmetric key, say the private key of a public/private key pair. The integrated circuit may also receive 410 an encrypted checksum. For example, the checksum may be comprised in the confidential data. The encrypted confidential data and/or the encrypted checksum may be received by receiver 140 and stored in register file 150. In order to decrypt the encrypted confidential data and/or the encrypted checksum the transport key is derived 320, 420. For example, controller 210 retrieves the customer identifier from OTP memory 220 and derives the transport key therefrom.

The transport key is used to decrypt the encrypted confidential data and/or encrypted checksum with the transport key 330, 430. For example, controller 210 may place the transport key in a key register of engine 230. Engine 230 decrypts the confidential data and/or encrypted checksum.

In one embodiment, controller 210 derives a key from an identifier, i.e., the customer identifier or integrated circuit identifier, by placing the identifier in a private data register of engine 230 and configures engine 230 with a master transport key; e.g. the master transport key is placed in a private key register of engine 230. Controller 210 may obtain the master transport key from the integrated circuit, preferably the secure module, e.g., from a ROM memory (not shown). The master transport key may also be hard-coded, e.g., in controller 210 or engine 230, etc. Controller 210 encrypts the identifier with the master transport key to obtain the transport or product key in a private data register of the engine. If desired key derivation may use a different mechanism, e.g., fully in software, without private registers, without AES, etc. To use the derived key, controller 210 may transfer the result in the private data register of the engine to the private key register of the engine. Preferably, the private key and data register are only accessible by engine 230 and controller 210, and not, e.g., by processor 110.

After the decryption the confidential data and/or checksum is available to controller 210 in plain format. Next the controller arranges engine 230 to derive the product key 340, 440 from the integrated circuit identifier. This derivation may use the same mechanism as deriving the transport key, except that it uses a different identifier.

Having access to the confidential data and/or the checksum, the controller may make use of these immediately, for example, the checksum may be verified for the confidential data. For example, if the confidential data comprises configuration data, the controller may configure the integrated circuit according to the configuration data. For example, in dependence upon the configuration data some feature of the integrated circuit may be enabled and/or disabled.

Controller 210 continues by encrypting the confidential data and/or checksum with the product key. Typically, controller 210 will use engine 230 for the encryption. After the encryption the re-encrypted result is stored in confidential data memory 220. The confidential data memory may require bit-by-bit programming. If so, controller 210 creates multiple write cycles to memory 220 until all bits are programmed. It may be that only '1' bits require a write cycle.

Figure 3B:
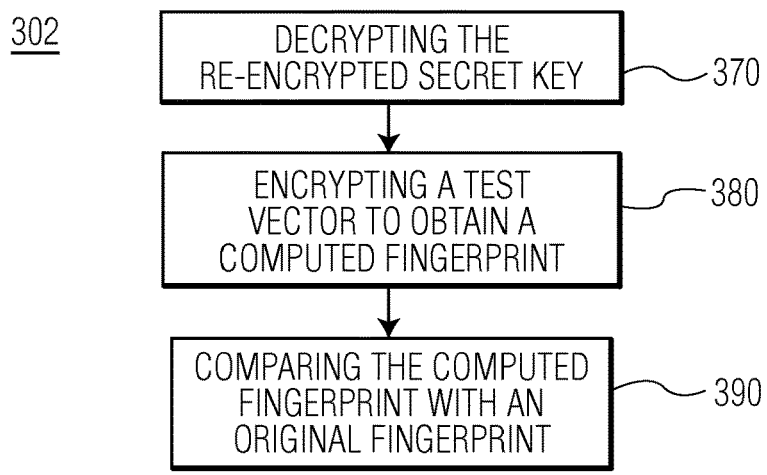
FIG. 3b is a schematic flow-chart for verifying a provisioned secret key.

FIG. 3b illustrates a method 302 for verifying a provisioned secret key. First the re-encrypted secret key is obtained in plain form. This may be done by deriving the product key and decrypting 370 the key stored in memory 220. Alternatively, the verifying may be done after 330 and before step 350, when the confidential data in which the secret key in comprised is available in plain format. A test vector is stored in the integrated circuit. Various mechanisms are available, for example, the test vector may be stored in the same manner as the master transport key. Preferably, the test vector is hard coded, e.g., in the controller. Controller 210 configures engine 230 to encrypt 380 the test vector with the secret key to obtain a computed fingerprint. The computed fingerprint is then compared 390 with an original fingerprint. The comparing may be done in the integrated circuit. For example, the original fingerprint may be part of the confidential data, or it may be part of non-confidential data which is also sent to the integrated circuit through receiver 140. Alternatively, the computed fingerprint may be exported to outside the integrated circuit, the comparing may then be done in the programming facility, or if so desired even at a different location, e.g. by the party who generated the secret key.

The fingerprint typically has the same bit-length as the secret key, but it may be truncated to save on transmission. For example a number of bits of the computed fingerprint less than the full length of the fingerprint, and less than the length of the secret key may be transmitted. For example, only half of the bits or only the first 32 bit, or less than or equal to 80 bits, may be exported. The number may be predetermined. This saves on valuable transmission time. At the same time, because of the randomization of engine 230 the chance of detecting a bad key is still high. Exporting beyond 80 bits gives diminished increases in security.

Figure 4B:
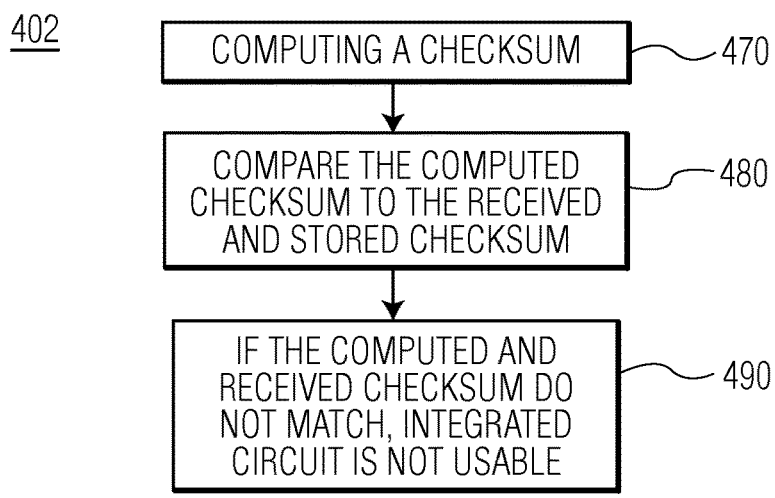
FIG. 4b is a schematic flow-chart for verifying a provisioned confidential data.

FIG. 4b illustrates method 402 which may be used if a checksum is used. The checksum may be keyed, such as the fingerprint mentioned or unkeyed, such as a hash function, the CRC function etc. For this method it is preferred that the checksum may be computed fast, in hardware and with low resources. For example, the checksum may be a linear function of the confidential data, e.g. secret key. To use the checksum a computed checksum is computed from the confidential data by controller 210. If not yet available the confidential data is first decrypted from memory 220 by engine 230 under control of controller 210 using the product key. The computed checksum is then compared to the checksum received, e.g., using method 401. If the computed and received checksums do not match, the integrated circuit is not usable. For example, secure module 200 may refuse to do further operation, in particular further operations with the secret key.

Figure 5A:
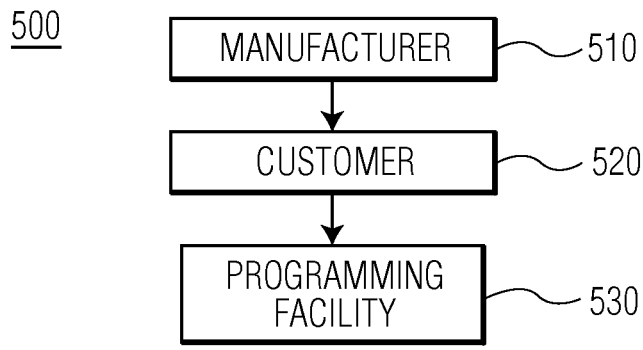
FIG. 5a is a schematic block diagram of a system for provisioning an integrated circuit with confidential data.
Figure 5B:
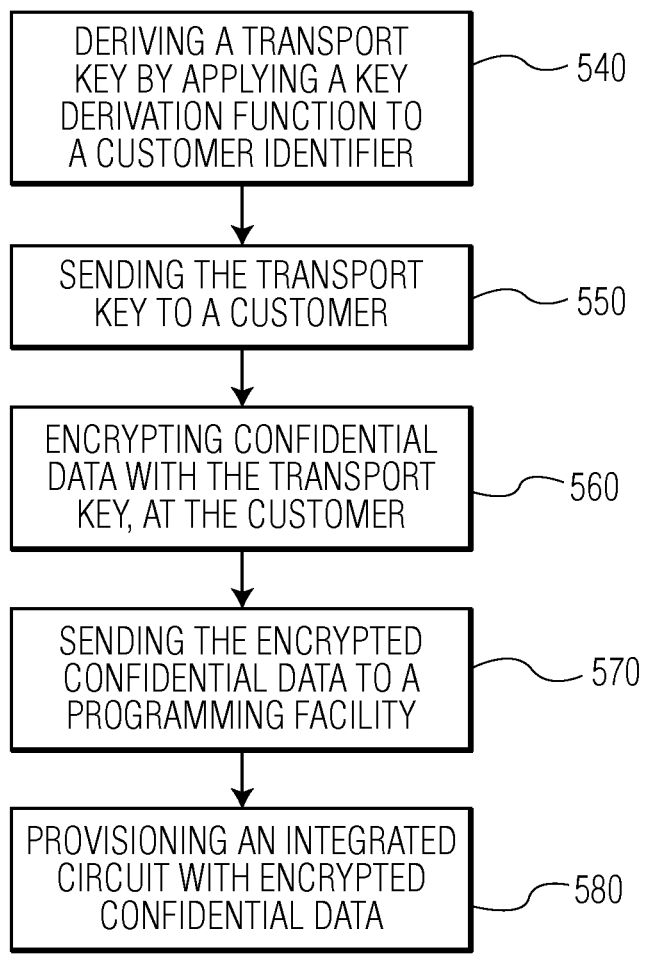

FIG. 5a illustrates a system for provisioning the integrated circuit. FIG. 5b illustrates a method of using the system. FIG. 5a shows how different responsibilities may be divided over three parties, labeled 'manufacturer 510', 'customer 520' and 'programming facility 530'. This partition increases security. Although labeled thus, the manufacturer does not necessarily do the actual manufacturing.

In one scenario manufacturer 510 derives a transport key by applying a key derivation function to a customer identifier using the master transport key. The manufacturer has knowledge of the master transport key. For example, the master transport key is embedded in the design of the integrated circuit, e.g., hard coded. For example, the manufacturer knows the master transport key because it knows, e.g., designed, the design of the integrated circuit. The manufacturer 510 sends 550 the transport key to the customer 520. Thus the customer does not known the master transport key and/or the key derivation function is not able to derive the transport key himself. Typically, the customer will know its own customer identifier, but this is not necessary.

Using the transport key the customer encrypt 560 any data which it wants provisioned on an integrated circuit, yet wants to keep confidential from the programming facility; the so-called confidential data. The confidential data may include secret keys, configuration data, proprietary algorithms and the like. If desired also integrity protection may be added to the confidential data, e.g., a message authentication code computed using a key, say the transport key. The confidential data may include a checksum of the confidential data. The customer may bundle the confidential data with non-confidential data. A fingerprint may be included in the non-confidential data.

The customer sends 570 the encrypted confidential data to the programming facility. The sending may use a digital network, say the internet and intranet, digital mail, a memory stick, and the like. The programming facility does not have knowledge of the transport key nor of the master transport key. If the programming facility will do the provisioning of the customer identifier, then the programming facility needs access to it. For example, the programming facility may receive the customer identifier from the customer. If the customer does not have it, the programming facility may receive it from the manufacturer 510.

The integrated circuit is provisioned with the customer identifier (e.g. customer number) and the integrated circuit identifier (e.g. integrated circuit number); typically by the programming facility. The programming facility provisions 580 the integrated circuit with the encrypted confidential data. Since the programming facility does not have access to the transport key, key derivation function or master key, the programming facility cannot make use to the confidential data. The integrated circuit has an embedded master transport key and thus can obtain the transport key, decrypt the confidential data and make use of it. The integrated circuit may subsequently if so desired derive a product key re-encrypt the confidential data or parts thereof, say the key parts, and store it in the confidential memory, e.g., that part of non-volatile memory reserved for the confidential data. Most if not all, integrated circuits have a unique integrated circuit number and so once the re-encryption is done, the data is useless for different integrated circuits.

Many different ways of executing the method are possible, as will be apparent to a person skilled in the art. The figures show a possible order in which the steps may be executed, but the order of the steps may be varied or some steps may be executed in parallel. Moreover, in between steps other method steps may be inserted. The inserted steps may represent refinements of the method such as described herein, or may be unrelated to the method. For example, steps 310 and 320 may be reversed or executed, at least partially, in parallel. Step 340 may be performed at any point before step 350, etc. Moreover, a given step may not have finished completely before a next step is started.

Figure 6A:
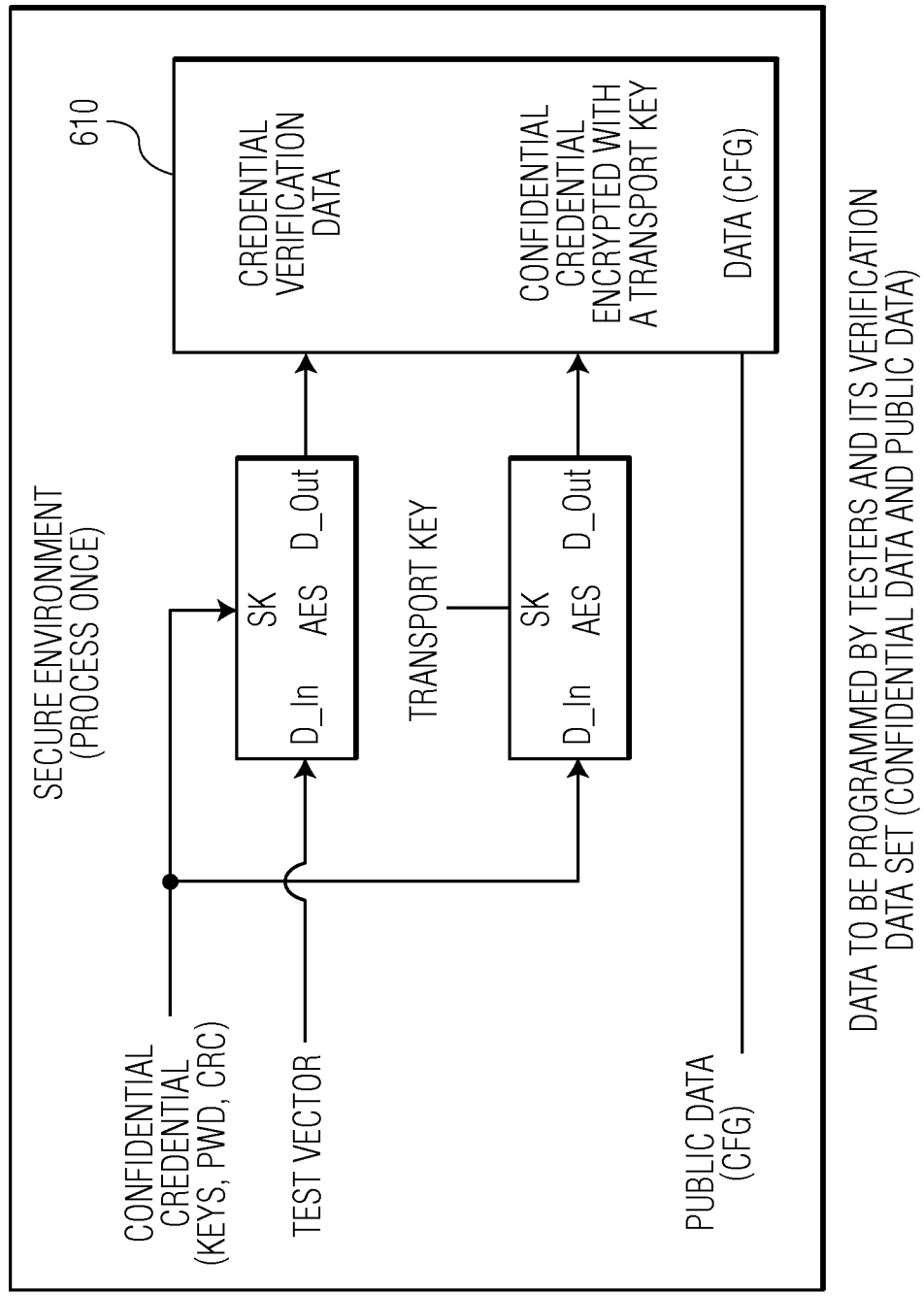
FIG. 6a illustrates an environment for encrypting confidential data.
Figure 6B:
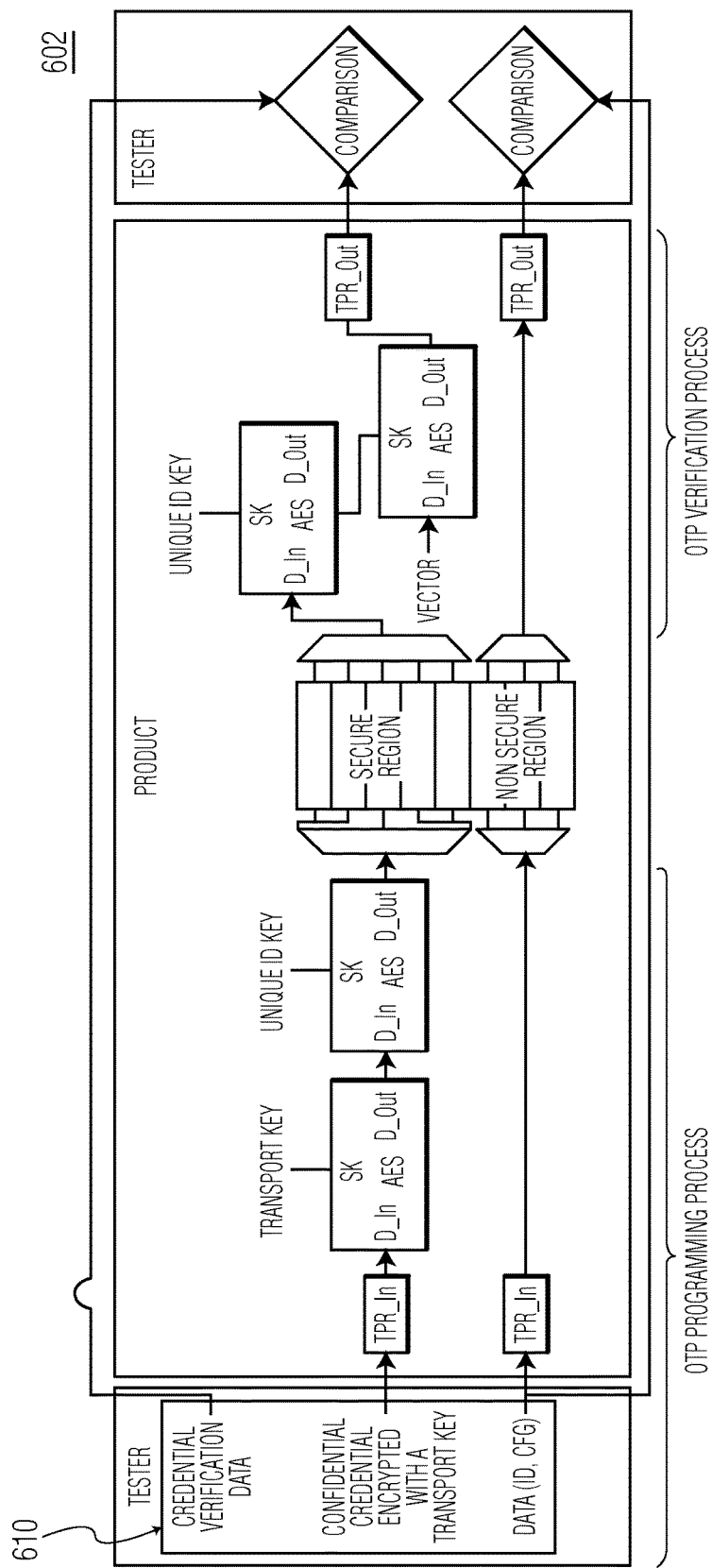
FIG. 6b illustrates a programming facility.

FIGS. 6a and 6b illustrate in schematic form yet another embodiment, further explained below. This embodiment is given to illustrate rather than to limit the invention.

Platform security has to deal with key management and key storage. The provisioning of secret keys (i.e. symmetric keys) can be a very expensive process. The main reason for this is that with symmetric keys, the keys need to be transported from the device where generated to the device where inserted. There are hardware solutions for secure key transport and loading but these can require a great deal of operation overhead and are typically cost-prohibitive. Next to this, the factory facilities need some dynamics to be able to support key programming and diversity in the device. This embodiment provides a secure transport mechanism that does not need a secure programming environment and where the keys are diversified in each IC by using a unique chip ID. The symmetric keys never appear in clear format outside of the device where generated and device where inserted. Illegitimate keys or keys modified during transport or storage will be detected leading to a non-operational IC. Furthermore, the key programming is handled in the IC where the dynamics of the key are transparent. This results in a cheaper key management environment, an easier key programming facility and a save and secure key storage in standard embedded OTP memory such as eFuse.

In security devices the main root of trust are the keys used to protect the confidentiality, integrity and authenticity of content. These keys are the main assets that requires high protection in the complete chain of trust from customer to product. The first problem in this chain is a secure transport of a key from the device where generated to the Integrated Circuit where it needs to be programmed. In many cases these keys are sent by the customer via a secure channel to a closed and secure environment in the factory. This secure environment is costly to setup and to maintain. The second problem is that this key needs to be programmed in the IC and traditionally, this key is sent in the clear by tester equipment to the IC via e.g. a JTAG interface. The tester needs to generate the correct programming sequences to program the keys in the OTP memory. This programming sequence is time consuming as the eFuse needs to be programmed bit by bit.

Our solution is based on a secure transport mechanism and a dynamic on-chip programming hardware module. The key is transferred encrypted with a transport key from the device where generated to the IC.

The key encrypted with the transport key is sent to the IC via a standard JTAG interface. Based on a standard customer JTAG instructions, the IC will perform four steps in pure hardware. The first step is the decryption of the key with a transport key diversified per customer. The second step is the encryption of the key with a unique product key used to guarantee confidentiality of OTP content. This unique product key is diversified per IC based on the unique product identifier (ID) and the master key is stored in a private hardware register. In the last step, a hardware module will generate for each bit a programming sequence and based on the bit value, the eFuse is programmed (bit-wise). In the final step, the content of OTP is verified: signature of the key programmed in OTP is computed within the IC and compared with a signature generated by the device where the key has been generated. For each product that is programmed with the same key, the OTP content will be different. These dynamics are based on the unique product ID and remains in the IC.

In FIGS. 6a and 6b the complete process is depicted. The two figures belong together, and are joined at reference number 610.

A. Transport mechanism. To protect the confidentiality of a key from the device where generated to the IC where to be programmed, the key is encrypted with a secret key called Transport Key (TKey) diversified per customer. CRC of the key to be programmed in the IC is computed and also encrypted with the Transport Key. The key and its CRC encrypted with the Transport key can be sent to the programming facility (unsecure if required).

B. Embedded key programming mechanism. When the IC e-fuse is programmed, the following process is performed:

1. Secret (key, CRC of the key) is stored in an IC internal register (reg 1).

2. Content of reg 1 is decrypted with the diversified transport key. The result is stored in an internal register (prReg) only accessible via a private bus. The diversified transport key is generated within the IC. The transport key diversification relies on a master transport key, the customer ID and the AES algorithm.

3. prReg content is encrypted with the unique product key. The result is stored in a temporary buffer (reg 2).

4. A finite state machine will generate the eFuse program sequence per bit position of reg 2 register. The characteristics of eFuse technology is that a bit position by default is a '0' and can only be programmed to a '1'. Based on the temporary register (reg 2), the eFuse is programmed when the bit position is '1'. For a key of 128 bits, after 128 program cycles, the complete key is programmed. This process can be repeated for as many keys are required to be programmed. This complete process is embedded in the device itself 5. During each secure boot sequence, CRC (Cyclic Redundancy Check) of the key that is stored in OTP is computed and compared to the CRC computed in A. When the 2 CRC doesn't match, the secure boot sequence will stop and the IC is not usable. CRC check will fail 1) if incorrect programming of the key in eFuse/OTP 2) or incorrect programming of the CRC value, 3) or the key has been modified during the transport of the key 4) or if an illegitimate key has been programmed.

The first two items are IC device related and protects against IC tampering. The last two items are transport and key related to avoid "the man in the middle attack". The key diversification is based on a master key, the unique IC ID and the AES engine. Master key, diversified keys and keys stored in OTP are only available in the clear on internal IC private busses. With this mechanism, the keys are never exposed in the clear outside of the device where generated and outside of the IC.

C. Programming verification mechanism. To verify that the keys programmed in OTP are correct without exposing in clear the key values, a mechanism based on a fingerprint of the key is implemented. During the process of encrypting the key in the secure environment, a fingerprint being the AES encryption result of a Test Vector by the key is computed. To verify the correctness of the key programmed in eFuse, the key stored encrypted in eFuse is first decrypted within the IC based on the Unique ID key. The resulting key is used to encrypt the embedded Test Vector. The result can be compared to the expected fingerprint of the key.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for provisioning integrated circuits with confidential data, the method comprising:
   embedding, by the manufacturer, a customer identifier during manufacture of each integrated circuit, wherein the integrated circuits share the customer identifier;
   deriving, by the manufacturer, for each integrated circuit, a transport key by applying a first key derivation function to the customer identifier and a master transport key;
   sending, by the manufacturer, the transport key to a customer, whereby the customer encrypts confidential data with the transport key and lacks information required for derivation of transport key;
   receiving, in each integrated circuit, the encrypted confidential data from the customer;
   deriving, in each integrated circuit, transport key by applying the first key derivation function to the customer identifier and the master transport key;
   decrypting, in each integrated circuit, the encrypted confidential data with the transport key to obtain decrypted confidential data;
   deriving, in each integrated circuit, a unique product key by applying a second key derivation function to an integrated circuit identifier and the master transport key, wherein the integrated circuit identifier was previously stored in the integrated circuit and is unique for each integrated circuit;
   encrypting, in each integrated circuit, the decrypted confidential data with the unique product key to obtain re-encrypted confidential data; and
   storing the re-encrypted confidential data in a confidential data memory of each integrated circuit in an eFuse.

2. The method as in claim 1, further comprising:
   storing the re-encrypted confidential data one bit at a time in a one-time programmable memory by a controller of each integrated circuit after the encrypted confidential data has been received completely.

3. The method as in claim 1, further comprising:
   deriving the transport key with an AES algorithm from the master transport key and the customer identifier; and
   deriving the unique product key with the AES algorithm from the master transport key and the integrated circuit identifier.

4. The method as in claim 3, further comprising:
   executing the AES algorithm with an AES engine; and
   storing a result of a derivation in an internal register of the AES engine.

5. The method as in claim 1, wherein the encrypted confidential data comprises a secret key.

6. The method as in claim 5, further comprising:
   verifying that the stored secret key is correct, the verifying step comprising:
   decrypting, with the unique product key and, within each integrated circuit, the re-encrypted secret key stored in the confidential data memory of each integrated circuit, to obtain a resulting key,
   encrypting a test vector embedded in each integrated circuit with the resulting key, to obtain a computed fingerprint, and
   comparing the computed fingerprint with an expected fingerprint.

7. The method as in claim 5, wherein the confidential data comprises a checksum of the secret key, and further comprising:
   during a secure boot sequence, computing a checksum of the key that is stored in the confidential memory;
   comparing the computed checksum to the received checksum; and
   after determining that the computed checksum and the received checksum do not match, stopping the secure boot sequence so that each integrated circuit is not usable.

8. The method as in claim 1, further comprising:
   receiving the integrated circuit identifier; and
   storing the received integrated circuit identifier one bit at a time in a one-time programmable customer memory by a controller of each integrated circuit after the integrated circuit identifier has been received completely.

9. The method of claim 3, wherein the master transport key is hard coded in the integrated circuit.

10. The method of claim 1, wherein the customer identifier is unique for a particular customer.

11. The method of claim 1, wherein the customer identifier is unique for a batch of integrated circuits associated with a particular customer.

12. A method for distributing confidential data comprising:

deriving, by a manufacturer, for each integrated circuit of a plurality of integrated circuits, a transport key by applying a key derivation function to a customer identifier and a master transport key, wherein the customer identifier was embedded by the manufacturer during manufacture of each integrated circuit and is shared by the plurality of integrated circuits;

sending the transport key to a customer, whereby the customer encrypts confidential data with the transport key and lacks information required for derivation of the transport key, wherein the customer sends the encrypted confidential data to a programming facility; and at the programming facility, provisioning each integrated circuit with the encrypted confidential data, wherein the provisioning further comprises:

receiving, in each integrated circuit, the encrypted confidential data;

deriving, in each integrated circuit, the transport key by applying the first key derivation function to the customer identifier and the master transport key;

decrypting, in each integrated circuit, the encrypted confidential data with the transport key to obtain decrypted confidential data;

deriving, in each integrated circuit, a unique product key by applying a second key derivation function to an integrated circuit identifier and the master transport key, wherein the integrated circuit identifier was previously stored in the integrated circuit and is unique for each integrated circuit;

encrypting, in each integrated circuit, the decrypted confidential data with the unique product key to obtain re-encrypted confidential data; and storing the re-encrypted confidential data in a confidential data memory of each integrated circuit in an eFuse.

* * * * *